United States Patent [19]

Baker

[11] 4,419,233
[45] Dec. 6, 1983

[54] CHLORINATOR FOR A SWIMMING POOL

[76] Inventor: Marvin E. Baker, 815 Ewing Ave., Nashville, Tenn. 37203

[21] Appl. No.: 322,465

[22] Filed: Nov. 18, 1981

[51] Int. Cl.³ .............................................. E04H 3/20
[52] U.S. Cl. ................................ 210/169; 210/198.1; 210/416.2; 422/277
[58] Field of Search ..................... 210/169, 198.1, 197, 210/416.2; 422/277, 278, 263

[56] References Cited

U.S. PATENT DOCUMENTS

| | | | |
|---|---|---|---|
| 3,129,172 | 4/1964 | Dickey et al. | 210/169 |
| 3,426,901 | 2/1969 | Sherper | 210/169 |
| 3,474,817 | 10/1969 | Bates et al. | 137/268 |
| 3,595,395 | 7/1971 | Lorenzen | 210/169 |
| 3,595,786 | 7/1971 | Horvath et al. | 210/198 |
| 3,615,244 | 10/1971 | Long et al. | 23/272.7 |
| 3,672,508 | 6/1972 | Simon | 210/128 |
| 3,846,078 | 11/1974 | Brett | 210/198.1 |
| 4,115,270 | 9/1978 | Phillps | 210/169 |
| 4,181,702 | 1/1980 | Watson | 210/169 |

Primary Examiner—Charles N. Hart
Assistant Examiner—Sharon T. Cohen
Attorney, Agent, or Firm—Harrington A. Lackey

[57] ABSTRACT

A chlorinator including a housing adapted to be submerged below the pool deck of a swimming pool, including a lower liquid chamber and an upper control chamber, and a chlorine container depending from the control chamber into the liquid chamber, a water inlet line extending through the pool wall below the normal water level of the pool communicating with the housing and the chlorine container, and a liquid outlet conduit connecting the lower liquid chamber to the return line on the downstream side of a Venturi orifice within the return line for discharging chlorine-treated water from the liquid chamber into the return line on the discharge side of the pump into the swimming pool.

5 Claims, 4 Drawing Figures

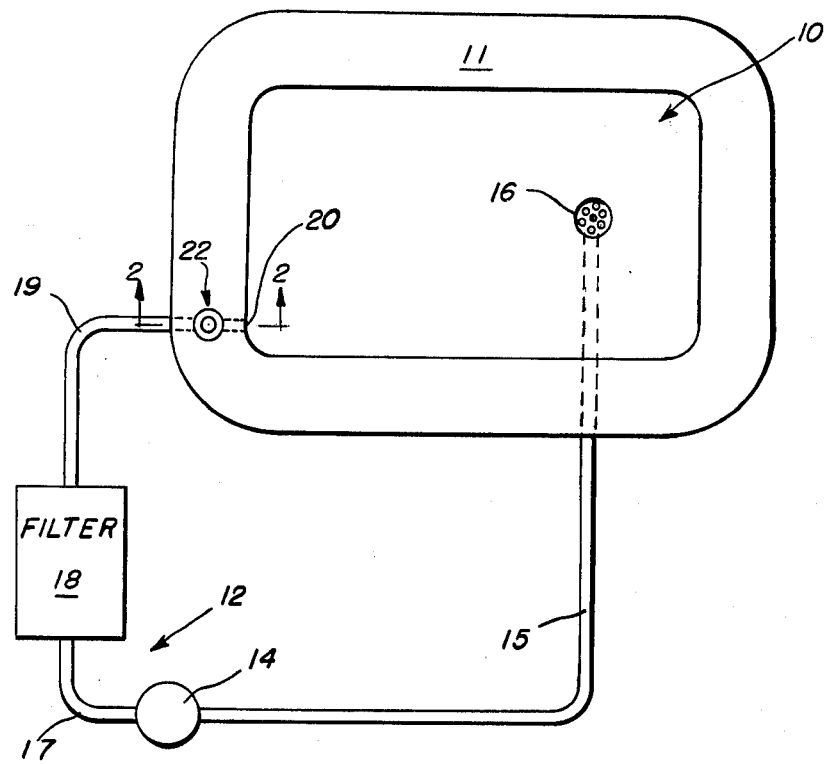
FIG. 1
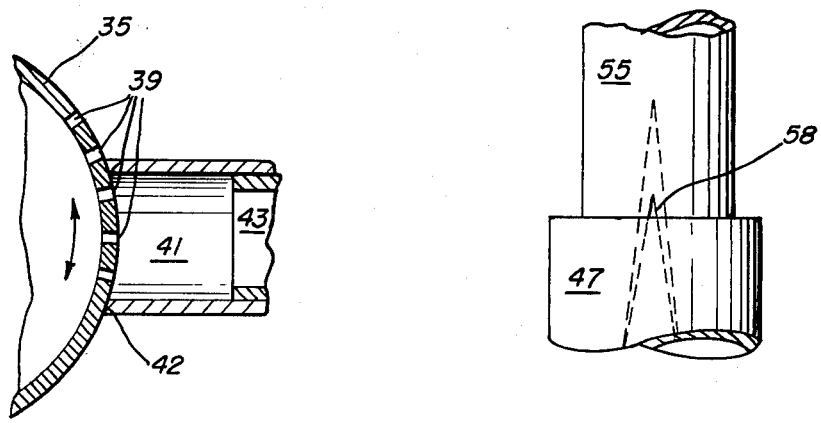
FIG. 3
FIG. 4

CHLORINATOR FOR A SWIMMING POOL

BACKGROUND OF THE INVENTION

This invention relates to a chlorinator for a swimming pool, and more particularly to a chlorinator for a swimming pool having a water recirculating system.

Chlorinators for swimming pools having water recirculation systems are well known in the art. Some of these chlorinators for swimming pools are illustrated in the following U.S. Pat. Nos:

3,129,172—Dickey, Jr. et al.—Apr. 14, 1964
3,426,901—Sherper—Feb. 11, 1969
3,474,816—Bates et al.—Oct. 28, 1969
3,595,395—Lorenzen—July 27, 1971
3,595,786—Horvath et al.—July 27, 1971
3,615,244—Long et al.—Oct. 26, 1971
3,672,508—Simon—June 27, 1972
4,067,808—Phillips—Jan. 10, 1978

The patents of Dickey, Jr., et al, Bates et al, Lorenzen, Simon and Phillips disclose chlorinators which introduce a chlorine solution to the return water line on the discharge side of the pump, just prior to the treated water entering the swimming pool. Moreover, all of these patents, except Phillips, disclose the chlorinated water being introduced into the return line to the swimming pool at the downstream end of a Venturi nozzle or orifice.

However, all of these patents, Dickey, Jr., et al, Bates et al, Lorenzen, Simon and Phillips, disclose a by-pass circuit for introducing water from the return line through the chlorinator for treatment, and then back into the same return line. Thus, the water supply of the chlorinator depends upon the operation of the pump, in order to effect sufficient water pressure to supply water to the chlorinator. Furthermore, after the pump is de-actuated, air is likely to be introduced into the line through the by-pass line to the chlorinator creating a priming problem for restarting the pump.

Simon also discloses a second pump in the chlorinator by-pass circuit.

The Sherper U.S. Pat. No. 3,426,901, discloses a chlorine container mounted on the skimmer to permit the water flowing from the pool into the skimmer to dissolve the chlorine, so that chlorine is entrained in the water stream flowing in the pool recirculation system. However, this chemically treated water has to flow through the entire recirculation system, including entering the suction side of the pump, before the water can be introduced into the swimming pool.

Horvath et al and Long et al merely disclose water treatment devices, which might be used in swimming pools. However, there is no teaching in Horvath et al or Long et al of the connection of these devices to the water recirculation system, or of their relative locations in respect to the pool or the recirculation lines.

None of the above patents disclose a device for introducing water into the chlorinator directly from the swimming pool, much less a device for producing gravity flow from the pool through the chlorinator, and thence to the recirculating return line.

Furthermore, none of the above patents disclose a chlorinator housing having a transverse partition wall dividing the housing into a lower liquid chamber and an upper control chamber, including a removable lid for the top of the control chamber, which housing is adapted to be submerged below ground level adjacent the pool, for the protection of the parts within the chlorinator from the weather, and for containment of the chlorine fumes, as well as for concealment from view, without sacrifice of accessibility for operation and maintenance.

SUMMARY OF THE INVENTION

It is therfore an object of this invention to provide a chlorinator for a swimming pool having a water recirculation system, which is capable of supplying chlorinated water to the return line on the discharge side of the pump, without being dependent upon the operation of the pump for the supply of water to the chlorinator.

It is a further object of this invention to provide a chlorinator for a swimming pool having a water recirculation system in which the chlorinator is submerged adjacent the swimming pool, and in which water is supplied by gravity directly from the swimming pool to the chlorinator, and the chlorinated water is supplied by gravity and/or aspiration from the chlorinator to the inlet port of the swimming pool through the return line.

The chlorinator made in accordance with this invention includes a housing, having a closable top, and adapted to be submerged within the ground or beneath the deck of the swimming pool, adjacent the swimming pool, so that the top of the housing is substantially flush with the ground or deck. The interior of the housing is divided by a transverse partition wall into a lower or bottom liquid chamber and an upper control chamber. The chlorinator container adapted to receive the soluble water treatment agents, such as chlorine tablets, is mounted upright within the housing through an opening in the partition wall so that the lower portion of the chlorine container is disposed within the liquid chamber and in communication with the liquid within the chamber, while the upper end of the container is disposed within the control chamber for easy accessibility for refilling the container, or for maintenance.

An inlet water line extends through the wall of the swimming pool below the normal water level of the pool and above the inlet port to the pool and is connected through the wall of the chlorinator housing, preferably in fluid communication with the lower portion of the chlorine container within the liquid chamber. Thus, water from the pool is supplied by gravity through the water inlet line and the chlorine container to force the water to dissolve the chlorine within the container. The treated water passes through outlet openings in the wall of the chlorine container into the liquid chamber. The treated water discharges from the liquid container through a valve-controlled water outlet conduit directly to the return line downstream of a Venturi orifice fitted within the return line substantially downstream of the discharge side of the pump. Thus, the chemically treated water flows by gravity from the liquid chamber to the return line, and is also drawn from the liquid chamber to the return line by the aspiration created by the flow of water in the recirculation system through the Venturi orifice.

A long-stem valve cooperates with the stand pipe of the outlet conduit in the housing and projects upwardly into the control chamber for ready accessibility to the control of the valve from the control chamber.

By merely removing the lid from the top opening of the chlorinator housing, the chlorine container and the valve stem are readily accessible for maintenance and operation, yet concealed from view. Moreover, the submerged housing provides complete protection for the elements within the chlorinator from the weather and normal wear and tear, accidental abuse and dirt and debris. Furthermore, the partition between the control chamber and the liquid chamber not only further seals and protects the elements within the liquid chamber, but also confines the chlorine vapors within the liquid chamber.

Furthermore, when the pool circulating pump is not operating, it will not lose its prime, because none of the water from the recirculation system flows into the chlorinator housing, and the integrity of the water within the recirculation system is maintained.

BRIEF DESCRIPTION OF THE DRAWINGS

FIG. 1 is a schematic plan view of a swimming pool having a recirculation system, employing the chlorinator made in accordance with this invention;

FIG. 3 is an enlarged fragmentary section taken along the line 3—3 of FIG. 2; and FIG. 4 is an enlarged fragmentary section taken along the line 4—4 of FIG. 2.

DESCRIPTION OF THE PREFERRED EMBODIMENTS

Figure 2:
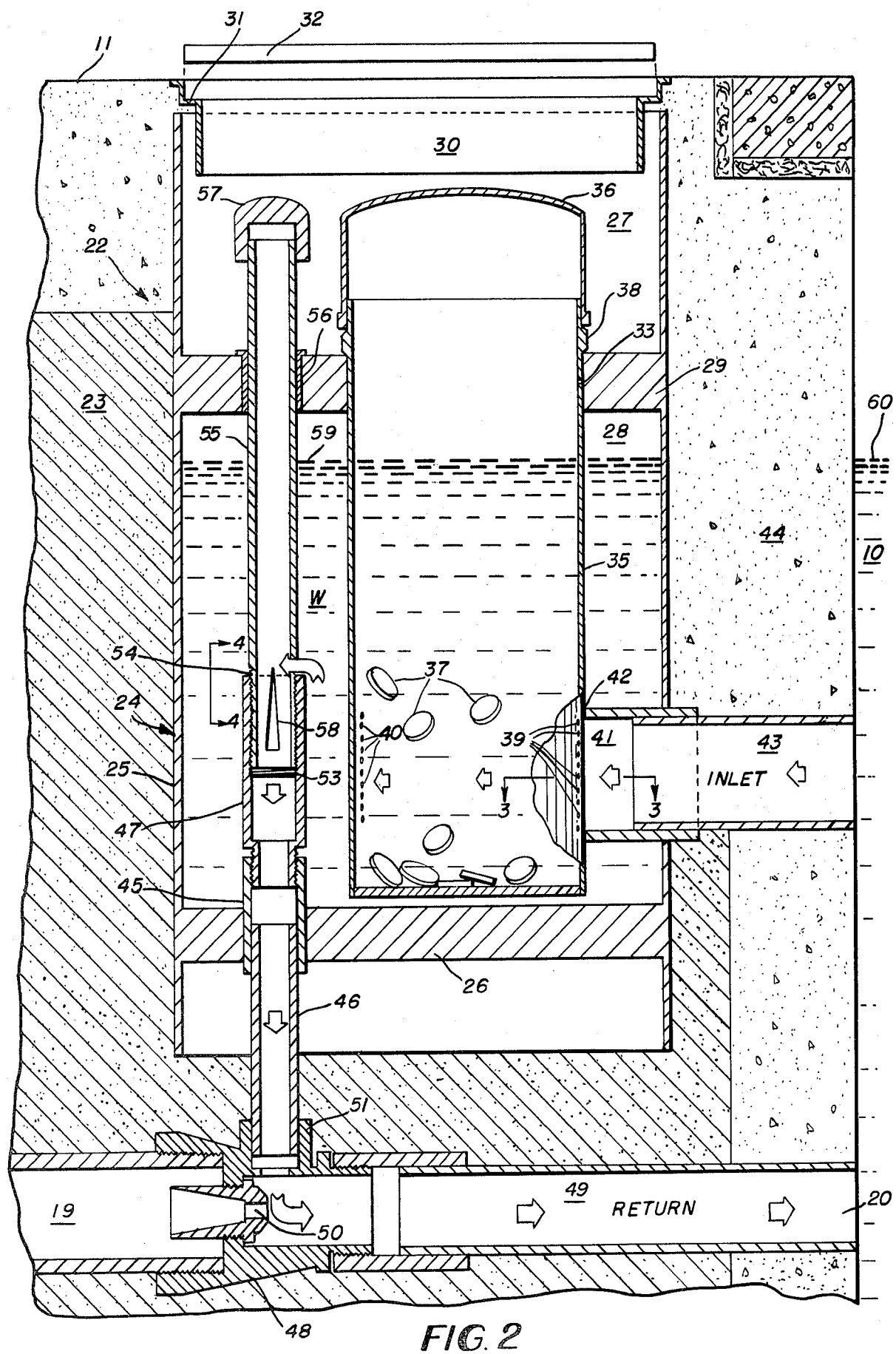
FIG. 2 is a greatly enlarged section taken along the line 2—2 of FIG. 1, illustrating the chlorinator.

Referring now to the drawings in more detail, FIG. 1 discloses a schematic view of a typical swimming pool 10 surrounded by a deck 11 of concrete or other masonry composition, and having a water recirculating system 12. The recirculating system 12 includes a pump 14, the intake of which is connected through intake line 15 to the drain 16 of the pool 10. The discharge side of the pump 14 is connected through discharge line 17 to the conventional swimming pool filter 18. The clean water from the filter 18 flows through the return line 19 and inlet port 20 back into the swimming pool 10.

The chlorinator 22 made in accordance with this invention is disclosed as being mounted through the deck 11 adjacent the swimming pool 10, submerged in the earth 23, and communicating with the return line 19, as best illustrated in FIGS. 1 and 2.

In its preferred construction, the chlorinator 22 includes a housing 24 having a cylindrical side wall 25, a bottom wall 26 and an open top portion. The housing 24 is divided into an upper control chamber 27 and a lower liquid chamber 28 by a transverse partition wall 29. The open top of the housing 24 may be provided with an annular collar 30 set in the concrete of the desk 11 and provided with a circular seat 31 for receiving the disc-shaped lid 32.

Supported within a circular hole 33 within the partition wall 29, and projecting from the control chamber 27 down substantially the full depth of the liquid chamber 28, is a container 35 for a water treatment agent, such as chlorine. As disclosed in the drawing, the container 35 is cylindrical and depends almost to the bottom of the liquid chamber 28. The top portion of the chlorine container 35 is open and adapted to be closed by a detachable cylindrical cap 36, within the control chamber 27. By removing the cap 36, the container 35 may be recharged or refilled with a water treatment agent, such as the chlorine tablets 37.

The cylindrical container 35 is supported in the hole 33, for manual rotational movement, by the annular shoulder 38 which rests upon the top of the partition wall 29.

The bottom portion of the cylindrical wall of the container 35 is provided with a plurality of inlet apertures or perforations 39, on one side of the container 35 (the right side in FIG. 2), and a plurality of exit or outlet apertures or perforations on the opposite side of the container wall 35 from the inlet apertures 39. Such apertures 39 and 40 permit a transverse flow of water or liquid solution through the bottom portion of the container 35 in the direction of the arrows illustrated in FIG. 2.

Extending snugly through a corresponding opening in the lower portion of the housing wall 25, is a cylindrical inlet sleeve or collar 41. The inner edge 42 of the sleeve 41 lies within an imaginary cylindrical surface having substantially the same radius as the cylindrical wall surface of the container 35. Thus, the inner edge 42 will seat snugly in a rotary slidable relationship against the outer cylindrical surface of the container 35. The outer end of the sleeve 41 projects through the housing wall 25 and is adapted to telescopingly receive in snug engagement the water inlet pipe or conduit 43, projecting through the swimming pool wall 44, and in fluid communication with the water in the swimming pool 10. Thus, as best illustrated in FIGS. 2 and 3, when the cylindrical container 35 is rotated about its own vertical cylindrical axis, a greater or lesser number of inlet apertures 39 may be brought into registry with the sleeve 41, to control the rate of flow of water from the swimming pool through the inlet conduit 43 and sleeve 41 into the container 35.

In order to discharge the chlorine-treated water W from the liquid chamber 28, a tubular collar 45 is fitted vertically through a corresponding opening in the bottom wall 26, to telescopingly receive a depending discharge conduit or pipe 46. The upper end portion of the collar 45 is threadedly secured to a standpipe 47 projecting upwardly into the liquid chamber 28.

As illustrated in FIG. 2, the return line 19 terminates in a threaded end portion which threadedly engages the inlet of a nozzle 48, the outlet end portion of which is threadedly secured to a return pipe section 49, which terminates in the inlet port 20 extending through the swimming pool wall 44. The nozzle 48 includes a Venturi orifice 50 and a lateral inlet connection 51 for receiving the lower end portion of the discharge conduit 46, so that chemically treated liquid W from the liquid chamber 28 may be discharged into the return line on the downstream side of the Venturi orifice 50.

The upper end portion of the standpipe 47 is provided with internal threads 53 for engaging the external threads 54 of a long-stem rotary valve member 55. The rotary valve member 55 extends upwardly from the liquid chamber 28 through a bushing 56 fitted within a corresponding vertical hole in the partition wall 29 and terminates in a handle member or knob 57 within the control chamber 27. The lower portion of the tubular rotary valve member 55 is provided with an elongated vertical slot 58, preferably triangular, converging upward. The vertical slot 58 is so positioned that as the valve member 55 is rotated in a direction to move the valve member 55 upward relative to the standpipe 47, a larger area of the slot 48 is exposed above the top of the standpipe 47 to permit the passage of the treated liquid in the liquid chamber 28 through the slot 58 and down through the standpipe 47, collar 45, and discharge conduit 46 into the nozzle 48 on the discharge side of the Venturi orifice 50. The discharge slot 58 is disclosed in its lower solid-line position of FIG. 4 to permit a low volume-rate of treated water to discharge downward through the standpipe 47. The dashed-line open position of the discharge slot 48, illustrated in FIG. 4, is attained when the valve member 55 has been elevated substantially to permit a greater volume-rate of flow through the discharge slot 58.

In the preferred form of the invention, the chlorinator 22 is located as close to the swimming pool 10 as possible, since the water supply for the liquid chamber 28 flows directly from the swimming pool 10. Thus, since most swimming pools are provided with a surrounding deck, the chlorinator 22 is located within the deck 11.

Furthermore, the housing 24 of the chlorinator 22 is submerged, within the deck 11 and the surrounding ground area 23, so that when the lid 32 closes the open top end portion of the housing 24, the lid 32 is substantially flush with the top surface of the deck 11. In this manner, the entire housing 24 and its contents are located close to the swimming pool 10 and the recirculating system 12, completely out-of-sight, and in such a manner as to be completely unobtrusive and unobstructive.

Nevertheless, the control chamber 27 is located conveniently close to the top surface of the desk 11, so that by merely removing the lid 32, the valve knob 47 and the container cap 36 become readily available for manipulation. By turning the valve knob 57 the flow of the chemically treated liquid W from the liquid chamber 28 into the return line 49, is varied. The cap 36 may be removed to replenish the chlorine tablets 37 or other chemical-treating agents within the container 35. Moreover, by merely rotating the cap 36, or the top of the container 35, the container 35 may be rotated to control the flow of water from the inlet collar 41 into the container 35.

By virtue of the transverse partition 29, the cap 36, the bushing 56 and the close fitting between the cylindrical surface of the container 35 and hole 33, the chlorine vapors generated within the container 35 and the liquid chamber 28 may be confined within the liquid chamber 28 and substantially sealed against emission into the control chamber 27, or into the atmosphere when the lid 32 is removed from the top opening of the housing 24.

Furthermore, the depth of the housing 24 is such that normally the water level 60 of the pool 10 will create an elevated water level 59 within the liquid chamber 28 by virtue of the fluid communication through inlet pipe 43 and collar 41. The water level 59 should be high enough to provide a constant reservoir within the liquid chamber 28 sufficient to dissolve the chemical agents or chlorine tablets 37, and to normally be above the top of the standpipe 47, so that there will be a constant supply of chemically treated liquid for the return pipe section 49.

Furthermore, the inlet pipe 43 and telescoping sleeve 41 should always be located below the normal water level 60 of the pool 10, so that water from the pool 10 will be available for supplying the liquid chamber 28 and the container 35, under normal operating conditions.

It is also important that the liquid chamber 28 be located above the return line 19 and return pipe section 49, so that water W will normally flow by gravity from the liquid chamber 28 through the standpipe 47 and inlet conduit 46 to the return lines 19 and 49. Discharge of the chemically treated liquid W from the liquid chamber 28 to the return line pipe 49 will also be assisted by the aspiration created by water passing through the return line 19 and the Venturi orifice 50 in the nozzle 48.

When water W is discharged from the liquid chamber 28 through the outlet conduit 46 into the nozzle 48, either by gravity or suction, or both, the liquid level 59 within the liquid chamber 28 will fall, thereby creating a temporary water head between the pool level 60 and the chamber level 59 to provide sufficient pressure for forcing water from the pool 10 through the inlet pipe 43 and into the cylindrical container 35 and the liquid chamber 28.

Furthermore, if the return line 19 is stopped up, or the pump 14 fails, or is inoperative for any reason, the water levels within the liquid chamber 28 as well as the water within the return line 19, will remain unaffected, because of the water head within the pool 10. Accordingly, there will be no risk of the pump 14 losing its prime.

The submerged location of the housing 24 also provides adequate protection for the components within the chlorinator 22 from the weather, and substantially minimizes the possibility of freezing the water and chlorine solution within the liquid chamber 28. Moreover, such protection is reinforced by the closure of the top lid 32, and the double-sealing of the liquid chamber 28 from the atmosphere by the transverse partition wall 29 and the top lid 32.

Furthermore, by supplying chlorine from the chlorinator 22 to the return line pipe 49, the chlorine-treated water W enters the recirculation system 12, not only at a remote distance from the pump 14, but also on the discharge side of the pump 14, so that the freshly treated water W will not pass through the pump 14 and subject it to corrosion.

The chlorinator 22 may be installed as original equipment, or may be added to an existing pool recirculating system 12.

What is claimed is:

1. A chlorinator system for a swimming pool comprising:
 (a) a swimming pool having a surrounding deck level and having a normal water level within the swimming pool,
 (b) a water re-circulating system including a pump, a drain line from the pool to the intake side of the pump, and a return line from the discharge side of the pump to the pool, the return line terminating in an inlet port through the wall of the swimming pool below said normal water level,
 (c) a housing having an enclosing side wall, a bottom wall adjacent said swimming pool wall exteriorly of said swimming pool, said bottom wall being below the normal water level of the swimming pool,
 (d) a transverse partition wall spanning said housing and spaced between said bottom wall and said open top portion to define a closed liquid chamber within said housing below said partition wall and a control chamber above said partition wall within said housing, said partition wall having a container opening therethrough,
 (e) a container for receiving soluble water-treatment agents, said container being received within said liquid chamber and projecting upwardly through said container opening into said control chamber, said container having an open upper end within said control chamber for receiving said water-treatment agents, (f) water inlet apertures in one side of said container below said partition wall, (g) water outlet apertures in the opposite side of said container from said inlet apertures, (h) a water inlet line in direct fluid communication between said swimming pool and said water inlet apertures, said inlet line being below said normal water level, (i) said water outlet apertures being in fluid communication with said liquid chamber, (j) a standpipe member extending through, and projecting above, said bottom wall, and terminating at a predetermined height within said liquid chamber to provide a liquid outlet from said liquid chamber above said bottom wall and said inlet port to said swimming pool and below said normal water level, (k) a Venturi orifice in said return line, and (l) said standpipe member being in fluid communication with said return line downstream of said Venturi orifice, so that the liquid from said liquid chamber flows by aspiration into said return line when water from the pump is flowing through said return line.

2. The invention according to claim 1 in which said housing is submerged in the ground adjacent said swimming pool, said open-top portion of said housing being substantially flush with said deck level, and a lid removably closing said open-top portion.

3. The invention according to claim 1 in which said container is cylindrical, said container opening is cylindrical, and said container is rotatably received within said container opening, said inlet apertures being circumferentially spaced in the wall of said container, said inlet line extending through said housing and in fluid communication with said inlet apertures, so that rotatable movement of said container varies the total area of said inlet apertures in fluid communication with said inlet line.

4. The invention according to claim 1 further comprising a valve member cooperating with said liquid outlet for varying the volume of the liquid flowing through said standpipe member from said liquid chamber, said valve member projecting through said partition wall into said control chamber for controlling said valve member within said control chamber.

5. The invention according to claim 4 in which said valve member comprises a cylindrical valve member and the upper end portion of said standpipe member being cylindrical and receiving said cylindrical valve member for vertical adjustable movement, said liquid outlet comprising a valve aperture in one wall of said valve member, whereby vertical adjustment of said valve member within said standpipe member varies the size of the flow opening through said valve aperture.

* * * * *